(12) United States Patent
Sahai et al.

(10) Patent No.: US 7,634,085 B1
(45) Date of Patent: Dec. 15, 2009

(54) IDENTITY-BASED-ENCRYPTION SYSTEM WITH PARTIAL ATTRIBUTE MATCHING

(75) Inventors: Amit Sahai, Los Angeles, CA (US); Brent R. Waters, Palo Alto, CA (US)

(73) Assignee: Voltage Security, Inc., Palo Alto, CA (US)

( * ) Notice: Subject to any disclaimer, the term of this patent is extended or adjusted under 35 U.S.C. 154(b) by 773 days.

(21) Appl. No.: 11/090,451

(22) Filed: Mar. 25, 2005

(51) Int. Cl.
*H04K 1/00* (2006.01)
*H04L 9/00* (2006.01)
*H04L 9/28* (2006.01)

(52) U.S. Cl. .......................... 380/28; 380/255; 713/182

(58) Field of Classification Search .................. 713/182
See application file for complete search history.

(56) References Cited

U.S. PATENT DOCUMENTS

| | | | |
|---|---|---|---|
| 2003/0081785 A1* | 5/2003 | Boneh et al. | 380/277 |
| 2004/0151308 A1* | 8/2004 | Kacker et al. | 380/30 |
| 2005/0002528 A1* | 1/2005 | Chen et al. | 380/255 |
| 2005/0039031 A1* | 2/2005 | Mont et al. | 713/189 |
| 2005/0084100 A1* | 4/2005 | Spies et al. | 380/30 |
| 2006/0123238 A1* | 6/2006 | Kacker et al. | 713/185 |

OTHER PUBLICATIONS

Yevgeniy Dodis et al., "Fuzzy Extractors: How to Generate Strong Keys from Biometrics and other Noisy Data" Eurocrypt 2004, pp. 1-47.*

Ari Juels et al., "A Fuzzy Commitment Scheme," 1999, ACM, 1-58113-148-8/99/0010, pp. 28-35.*
M. Bellare et al., "Key-Privacy in Public-Key Encryption" Sep. 2001.
Dan Boneh et al. "Efficient Selective-ID-Secure Identity Based Encryption Without Random Oracles", http://eprinit.iacr.org/2004/172 (Dec. 2004).
Dan Bonen et al., "Identity-Based Encryption from the Weil Pairing", Siam J. of Computing vol. 32, No. 3, pp. 586-615 (2003).
Xavier Boyen, "Reusable Cryptographic Fuzzy Extractors", http://eprint.iacr.org/2004/358/ (2004).
Ran Canetti et al., "A Forward-Secure Public-Key Encryption Scheme" (2003).

(Continued)

*Primary Examiner*—Emmanuel L Moise
*Assistant Examiner*—Luu Pham
(74) *Attorney, Agent, or Firm*—Treyz Law Group; G. Victor Treyz; David C. Kellogg

(57) ABSTRACT

Systems and methods for supporting an identity-based-encryption (IBE) scheme with partial attribute matching capabilities are provided. Plaintext may be encrypted into ciphertext using an IBE public key that is based on an attribute set w. A recipient of the ciphertext may have the attributes in an overlapping but different attribute set w'. The recipient may request an IBE private key for decrypting the ciphertext from an IBE private key generator. After verifying the recipient's credentials, the IBE private key generator may generate IBE private key components based on the recipient's attribute set w'. The recipient may use an IBE private key SK constructed from the IBE private key components to decrypt the ciphertext. Decryption will be successful even though attribute set w' is different from attribute set w, provided that the overlap $|w \cap w'|$ is greater than a threshold value.

16 Claims, 5 Drawing Sheets

OTHER PUBLICATIONS

Yevgeniy Dodis et al., "Fuzzy Extractors: How to Generate Strong Keys from Biometrics and other Noisy Data" (2004).
Ari Juels et al., "A Fuzzy Commitment Scheme," (1999).
Fabian Monrose "Toward Speech-Generated Cryptographic Keys on Resource Constrained Devices" (Extended Abstract) (2002).
Fabian Monrose et al., "Password Hardening Based on Keystroke Dynamics" (1999).
Amit Sahai, "Non-Malleable Non-Interactive Zero Knowledge and Adaptive Chosen-Ciphertext Security" (1999).
Brent Waters, "Efficient identity-based Encryption Without Random Oracles" (2004).
Daneng Yao et al., "ID-Based Encryption for Complex Hierarchies with Applications to Forward Security and Broadcast Encryption" (2004).

* cited by examiner

IDENTITY-BASED-ENCRYPTION SYSTEM WITH PARTIAL ATTRIBUTE MATCHING

BACKGROUND OF THE INVENTION

This invention relates to cryptographic systems, and more particularly, to identity-based-encryption (IBE) systems with partial attribute matching.

It is often desirable to encrypt sensitive electronic communications such as email messages. With symmetric key cryptographic arrangements, the sender of a message uses the same key to encrypt the message that the recipient of the message uses to decrypt the message. Symmetric key systems require that each sender and recipient exchange a shared key in a secure manner.

With public key cryptographic systems, two types of keys are used—public keys and private keys. Senders may encrypt messages using the public keys of recipients. Each recipient has a private key that is used to decrypt the messages for that recipient.

To ensure the authenticity of the public keys in traditional public key systems and thereby defeat possible man-in-the-middle attacks, public keys may be provided to senders with a certificate signed by a trusted certificate authority. The certificate may be used to verify that the public key belongs to the intended recipient of the sender's message. Public key encryption systems that use this type of traditional approach are said to use the public key infrastructure (PKI) and are referred to as PKI cryptographic systems.

Identity-based-encryption (IBE) public key cryptographic systems have also been proposed. As with PKI cryptographic systems, a sender in an IBE system may encrypt a message for a given recipient using the recipient's public key. The recipient may then decrypt the message using the recipient's corresponding private key. The recipient can obtain the private key from an IBE private key generator.

Unlike PKI schemes, IBE schemes generally do not require the sender to look up the recipient's public key. Rather, a sender in an IBE system may generate a given recipient's IBE public key based on known rules. For example, a message recipient's email address or other identity-based information may be used as the recipient's public key, so that a sender may create the IBE public key of a recipient by simply determining the recipient's email address.

It may be desirable to construct IBE public keys from attributes that represent real-world conditions that the recipient of an IBE-encrypted message needs to satisfy before being permitted to perform decryption operations. When this type of IBE scheme is used, the IBE public keys contain sets of attributes. When a recipient requests an IBE private key from an IBE private key generator, the recipient provides credentials to the IBE private key generator that establish that the recipient properly satisfies the conditions embodied in the attributes. After the IBE private key generator has successfully authenticated the recipient, the IBE private key generator provides the recipient with the requested IBE private key. The recipient may then use the requested IBE private key to perform decryption operations.

As the number of attributes used in an IBE system increases, system complexity grows rapidly with the number of possible combinations of the attributes. It would be desirable to be able to provide an IBE scheme that efficiently scales with increasing attribute complexity and that is flexible enough to handle situations in which a given recipient might not have all of the same attributes that were used during encryption, or might possess additional attributes.

SUMMARY OF THE INVENTION

The present invention provides an IBE scheme with partial attribute matching capabilities. With this scheme, it is possible to use different sets of attributes during encryption and decryption, provided that the sets of attributes overlap sufficiently.

During system setup operations, a threshold attribute overlap parameter d is established. The parameter d is an integer that represents the amount of matching that is required between the attribute set used during encryption and the attribute set used during decryption. Other system setup operations involve establishing a master secret at an IBE private key generator and publishing IBE public parameters. The IBE public parameters may be published by making them available on an IBE public parameter host or using any other suitable publication arrangement.

Unencrypted data (plaintext M) may be encrypted by a user (generally referred to as a sender) using an IBE encryption engine. The plaintext may include audio, video, executable code, text, or any other suitable data. The encrypted version of the plaintext M is referred to as ciphertext E. The ciphertext E may be decrypted by a user (generally referred to as a recipient) using an IBE decryption engine. The IBE encryption and decryption engines may be stand-alone software components, may be built into an operating system, may be provided as part of client software (e.g., an email program), may be provided as a plug-in to an application, etc.

The IBE public keys in the system are based on attributes. At least some of the attributes correspond to real-world conditions that users must satisfy before they are allowed to decrypt ciphertext.

During encryption operations, a sender encrypts plaintext M using the IBE encryption engine. The inputs to the IBE encryption engine are the IBE public parameters and the IBE public key of the intended recipient. The output of the IBE encryption engine is the ciphertext E. The sender may obtain the IBE public parameters prior to encryption by contacting the IBE public parameter host. The IBE public key of the intended recipient can be constructed based on known rules. The attributes that make up the IBE public key of the recipient form an attribute set w. The ciphertext E includes the attribute set w.

Following encryption, the ciphertext E is delivered to the recipient. For example, the ciphertext E may be transmitted to the recipient electronically over a communications network such as the internet.

The recipient has a set of attributes w' that are generally not the same as the set of attributes w used for the IBE public key during encryption. The set of attributes w' does, however, overlap somewhat with the set of attributes w. For decryption to be successful, the amount of overlap $|w \cap w'|$ must be greater than or equal to the threshold attribute overlap parameter d.

When the recipient desires to decrypt the ciphertext E, the recipient formulates an IBE private key request for the IBE private key generator. The IBE private key request includes the attribute set w' and includes recipient credentials. (If desired, a single request may be broken up into multiple separate requests that are processed individually. Also, the request may take place before receipt of the ciphertext.) The recipient credentials serve to certify that the recipient satisfies the real-world conditions associated with the attributes w'. For example, an attribute may specify that the recipient must be greater than 30 years of age. In this situation, the recipient credentials include a credential that establishes that the recipient is over 30 years old.

The IBE private key generator receives the IBE private key request from the recipient and authenticates the recipient's credentials to verify that the recipient is authorized to receive the requested IBE private key. If the recipient is authorized, the IBE private key generator provides the recipient with IBE private key components, each of which corresponds to an associated one of the attributes in the attribute set w'. The IBE private key SK is constructed from the individual IBE private key components. The components are specific to their requesters, so multiple partially-authorized users cannot collude. The private key SK is independent of the ciphertext E and the attribute set w; therefore, the private key request made by the recipient to the key generator can be made before reception of the ciphertext, and the private key SK can be used to decrypt multiple ciphertexts.

The recipient uses the IBE private key SK to decrypt the ciphertext E to produce plaintext M. In performing decryption operations, the recipient uses the IBE decryption engine. The inputs to the IBE decryption engine include the ciphertext E and the IBE private key SK. The output of the IBE decryption engine is the plaintext M.

Because the IBE scheme of the present invention supports partial attribute overlapping, the IBE private key that was obtained based on attribute set w' can be used for decryption, even thought the IBE public key that was used for encryption was constructed from a different attribute set w. The system will consider the IBE public key and private key to be a sufficiently close match, so long as the amount of overlap exceeds the threshold attribute overlap parameter established during system setup.

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to cryptographic systems and methods. The invention uses hardware and software to implement an identity-based-encryption (IBE) partial attribute matching scheme. Computing equipment is used to implement an IBE private key generator and, if desired, an IBE public parameter host. Senders and recipients of encrypted messages may use computing equipment to run IBE encryption and decryption engines. The computing equipment includes hardware such as processors and storage (e.g., fixed and removable storage media). The computing equipment may be electrically linked through a communications network. This allows users to communicate electronically (e.g., to send encrypted messages through email, to request private keys electronically, to obtain IBE public parameters electronically, etc.). The software of the present invention includes code that, when installed and run on the hardware of the system, configures the system to perform the methods of the invention (e.g., method steps such as those described in connection with the flow charts and diagrams of the FIGS).

The cryptographic systems and methods of the present invention can be used in any scenario in which it is desired to encrypt and decrypt information. In the present discussion, the information to be encrypted is generally referred to as the plaintext or message M. The plaintext may include text, audio, video, executable code, or any other suitable data. The encrypted version of the plaintext is called ciphertext. The invention is generally described in the context of a sender who desires to send the ciphertext to a recipient. Users such as senders, recipients, and other entities in the systems of the present invention may be individuals, organizations, or any other suitable entities.

Figure 1:
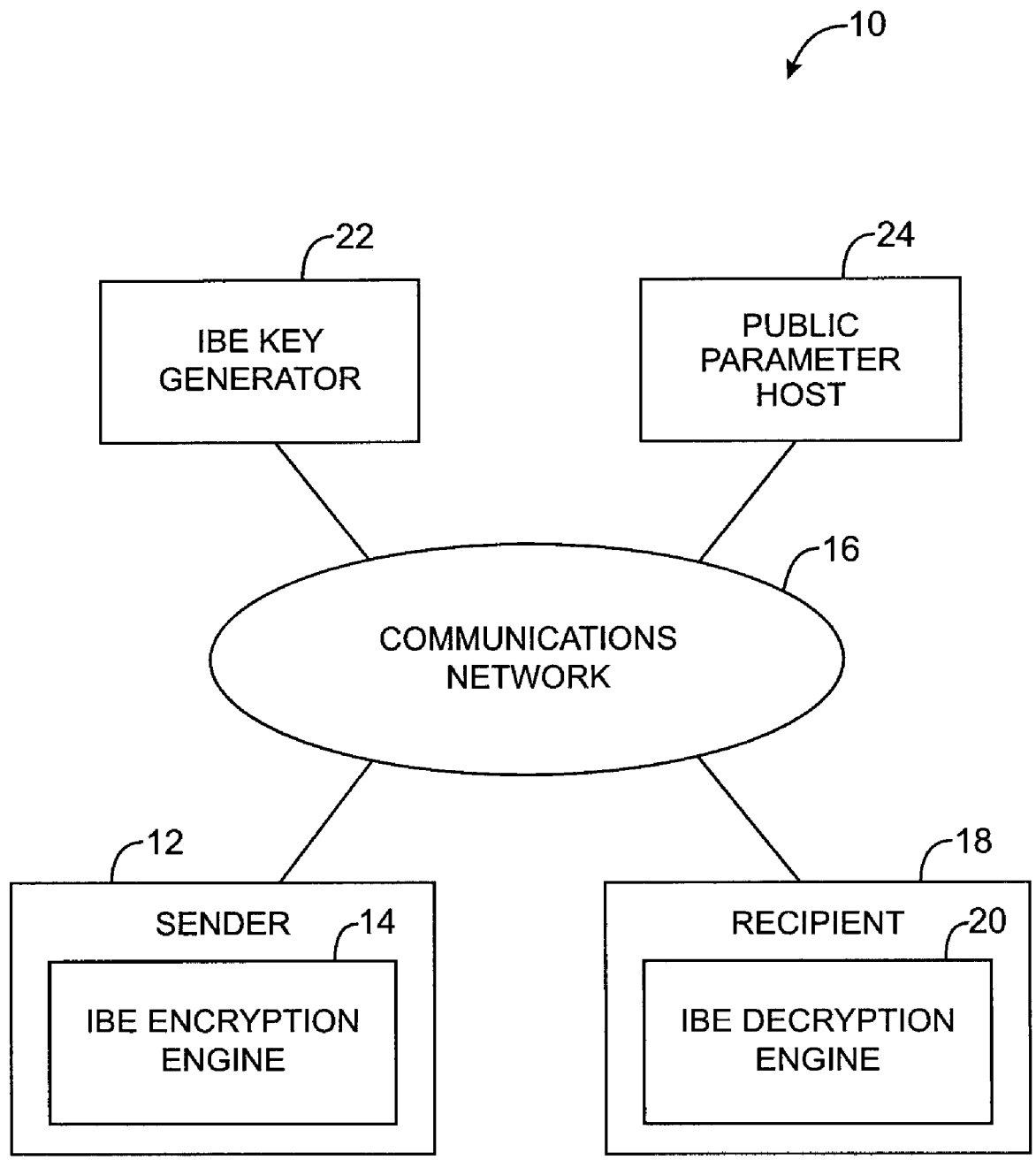
FIG. 1 is a diagram of an illustrative system in which messages may be encrypted and decrypted using identity-based-encryption with partially matching attributes in accordance with the present invention.

An illustrative system 10 that may use identity-based-encryption (IBE) with partial attribute matching is shown in FIG. 1. In system 10, a sender may send ciphertext to a recipient over a communications network 16. Ciphertext may be conveyed in an electronic message (e.g., an email) or using any other suitable arrangement.

Senders and recipients may communicate with each other using equipment 12 and 18. Equipment 12 and 18 (and the equipment for the other entities in the system) may, for example, include computing equipment such as a personal computers, portable computers, workstations, mainframe computers, networked computers or terminals such as computer terminals that are connected to the Internet using a host computer in a local area network, handheld computers, or any other suitable electronic equipment.

The equipment of FIG. 1 may be interconnected by communications paths in communications network 16. Network 16 may include the Internet and other wide area networks, one or more local area networks, switched telephone networks, networks such as virtual private networks, networks including dedicated leased lines, networks based on wired or wireless paths, or any other networks formed using any other suitable network technology.

The sender uses an IBE encryption engine 14 at equipment 12 to encrypt the plaintext message M into ciphertext E before sending ciphertext E to the recipient. At the recipient, the recipient uses IBE decryption engine 20 to decrypt the ciphertext to obtain access to the plaintext M.

The inputs to the IBE encryption engine 14 are the IBE public key of the recipient, the so-called IBE public parameters, and the plaintext M. The corresponding output of the IBE encryption engine is the ciphertext E. The inputs to the IBE decryption engine 20 are the ciphertext E and an IBE private key that is suitably related to the IBE public key used during message encryption. The output of the IBE decryption engine 20 is the plaintext M.

The IBE public parameters used during encryption are generated by the IBE key generator 22 during system setup operations. The IBE public parameters are then published so that they are available to senders in system 10. Any suitable technique may be used to publish the IBE public parameters. For example, the IBE public parameters can be provided to senders by the IBE key generator 22, can be listed in a directory, or can be provided to the sender by the recipient in a peer-to-peer fashion. With one suitable arrangement, the IBE public parameters are published by placing them on a publicly-accessible IBE public parameter host 24.

Identity-based-encryption schemes are so named because the public key of the recipient can be based on identity information such as the recipient's email address, name, or social security number. In the present invention, the IBE public key used to encrypt M for the recipient is based on a set of attributes w.

The attributes w may include recipient identity information (e.g., email address) and other recipient attributes. In one suitable arrangement, the attributes are used as conditions that must be fulfilled prior to release of the corresponding IBE private key. Illustrative conditions that may be embodied in attributes are: age>18, eye color=blue, gender=male, title=engineer, state of residence=California, date=at least 2004. In general, not all of the attributes need be personal to the recipient. For example, attributes may be externally derived (e.g., the current date). When the recipient receives the ciphertext, the recipient can extract the set of attributes w and use the extracted attributes in formulating an IBE private key request for IBE key generator 22. In general, the process of creating the ciphertext and formulating the key request are independent of one another, so ciphertext can be created before or after a private key request is generated by the recipient. Moreover, once the recipient has obtained a copy of an IBE private key, the recipient can cache a copy of the IBE private key locally, on the recipient's equipment. Later, when the recipient desires to perform a decryption operation, the recipient can retrieve the cached IBE private key from the local cache, without formulating an IBE private key request for the IBE private key generator. With this type of arrangement, a recipient need only request a new IBE private key when an old IBE private key expires.

In accordance with the present invention, an IBE private key that is based on one set of attributes (w') can be used to decrypt ciphertext that was encrypted using another set of attributes (w), even if the two sets are not identical. During system setup operations, the IBE key generator (system administrator) establishes a threshold attribute overlap parameter d. The parameter d defines the degree to which the encrypting attribute set w and the decrypting attribute set w' need to match. So long as $|w \cap w'| \geq d$, an IBE private key based on attribute set w' will be able to decrypt ciphertext encrypted using an IBE public key based on attribute set w. The ability to have partially matching attribute sets makes the system more flexible than IBE systems in which an exact match is required. Moreover, the system can be scaled to support very large numbers of attributes.

Figure 2:
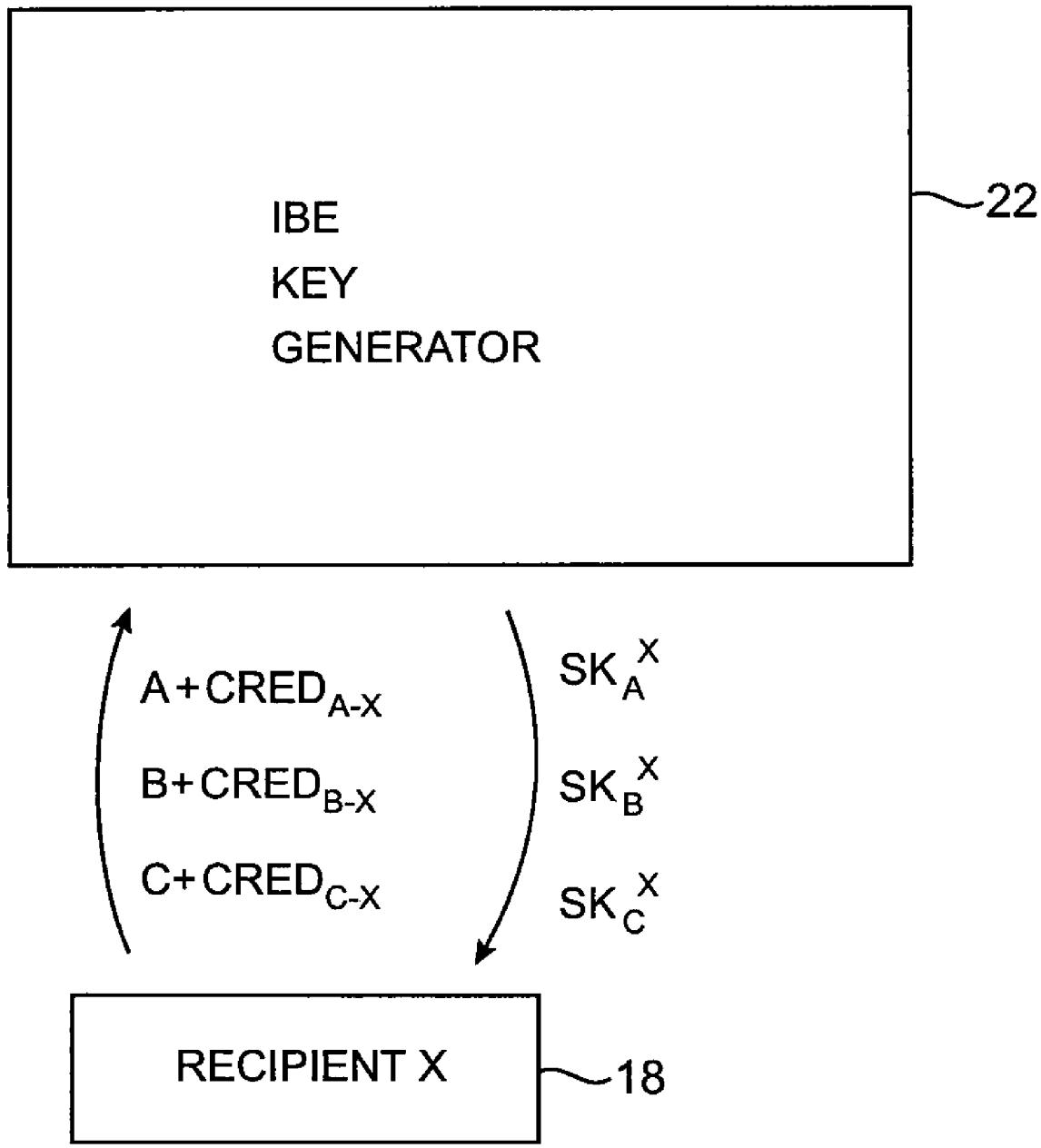
FIG. 2 is a diagram showing how a recipient can request an IBE private key corresponding to a set of IBE public key attributes and can be provided with corresponding IBE private key components in accordance with the present invention.

The attribute-based key request process is illustrated in the diagram of FIG. 2. In the example of FIG. 2, a recipient X has received ciphertext E and needs to obtain an IBE private key to decrypt its contents. The recipient X therefore contacts IBE private key generator 22 and requests a copy of the IBE private key. In making the key request, the recipient X provides the IBE key generator with attributes A, B, and C (in this example). The recipient also provides the IBE key generator 22 with credentials.

The credentials serve to establish that recipient X has the attributes A, B, and C. This is illustrated by the notation of FIG. 2. In particular, the credentials $CRED_{A-X}$ are used to certify that recipient X has attribute A. Similarly, credentials $CRED_{B-X}$ serve to certify that recipient X has attribute B and credentials $CRED_{C-X}$ serve to certify that recipient X has attribute C.

As shown in FIG. 2, IBE key generator verifies the recipient's credentials and, if the credentials are satisfactory, provides corresponding IBE private key components $SK_A^X$, $SK_B^X$, and $SK_C^X$ to recipient X. The IBE private key generator 22 generates private key components for each recipient using a different random polynomial. As a result, private key components are tied to a particular user.

In the example of FIG. 2, the superscript "X" indicates that private key components $SK_A^X$, $SK_B^X$, and $SK_C^X$ have been generated for recipient X. Because different users have their private key components generated with different random polynomials, multiple colluding users will be unable to combine their private key components to decrypt an encrypted message. The IBE encryption scheme of the present invention is therefore collusion resistant.

The partial attribute overlap feature of the invention may be used in document distribution applications and other attribute-based encryption scenarios. Consider the situation in which a party wishes to encrypt a document to all users that have a certain set of attributes. For example, in a computer science department, the chairperson might want to encrypt a document to all of its systems faculty on a hiring committee. In this case the chairperson would encrypt the document using the IBE public key {"hiring-committee", "faculty", "systems"}. Any user who satisfies the conditions embodied in all three of these attributes will be provided with an IBE private key by the IBE key server 22 to decrypt the document. By using an IBE scheme with partial attribute matching capabilities, it is possible to set the attribute matching parameter d to a value of 2 (as an example). If d is 2, any user who satisfies at least two of the three attributes can decrypt the document. Because IBE is used to encrypt the document, the document can be stored on an untrusted storage server prior to delivery to the intended recipients (rather than relying on a trusted server to perform authentication checks before delivering the document).

Figure 3:
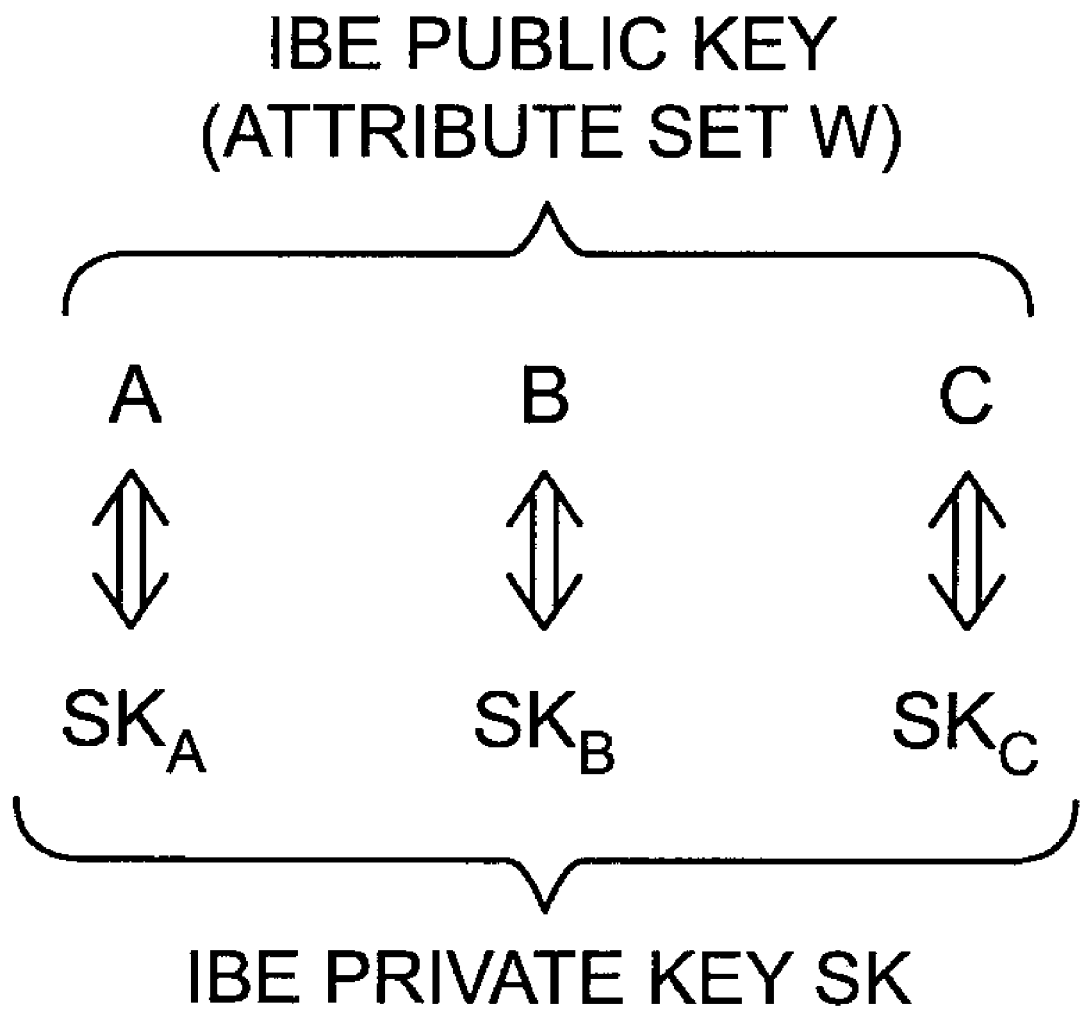
FIG. 3 is a diagram showing the relationship between the attributes in an IBE public key and the components in a corresponding IBE private key in accordance with the present invention.

FIG. 3 shows a one-to-one relationship between IBE public key parameters A, B, and C and corresponding IBE private key components $SK_A$, $SK_B$, and $SK_C$. The parts of the IBE public key A, B, and C are attributes and make up an attribute set w. The corresponding IBE private key components $SK_A$, $SK_B$, and $SK_C$ are constituent parts of the corresponding IBE private key SK. With the partial attribute matching feature of the present invention, it is not necessary for the attribute set of the IBE public key used during encryption to exactly match the attribute set associated with the private key components used during encryption. For example, if the attribute overlap parameter d is 1, a message encrypted using IBE public key attributes A and B can be successfully decrypted using an IBE private key SK containing IBE private key components $SK_B$ and $SK_C$ (where the B subscript indicates that IBE private key component $SK_B$ corresponds to attribute B).

Figure 4:
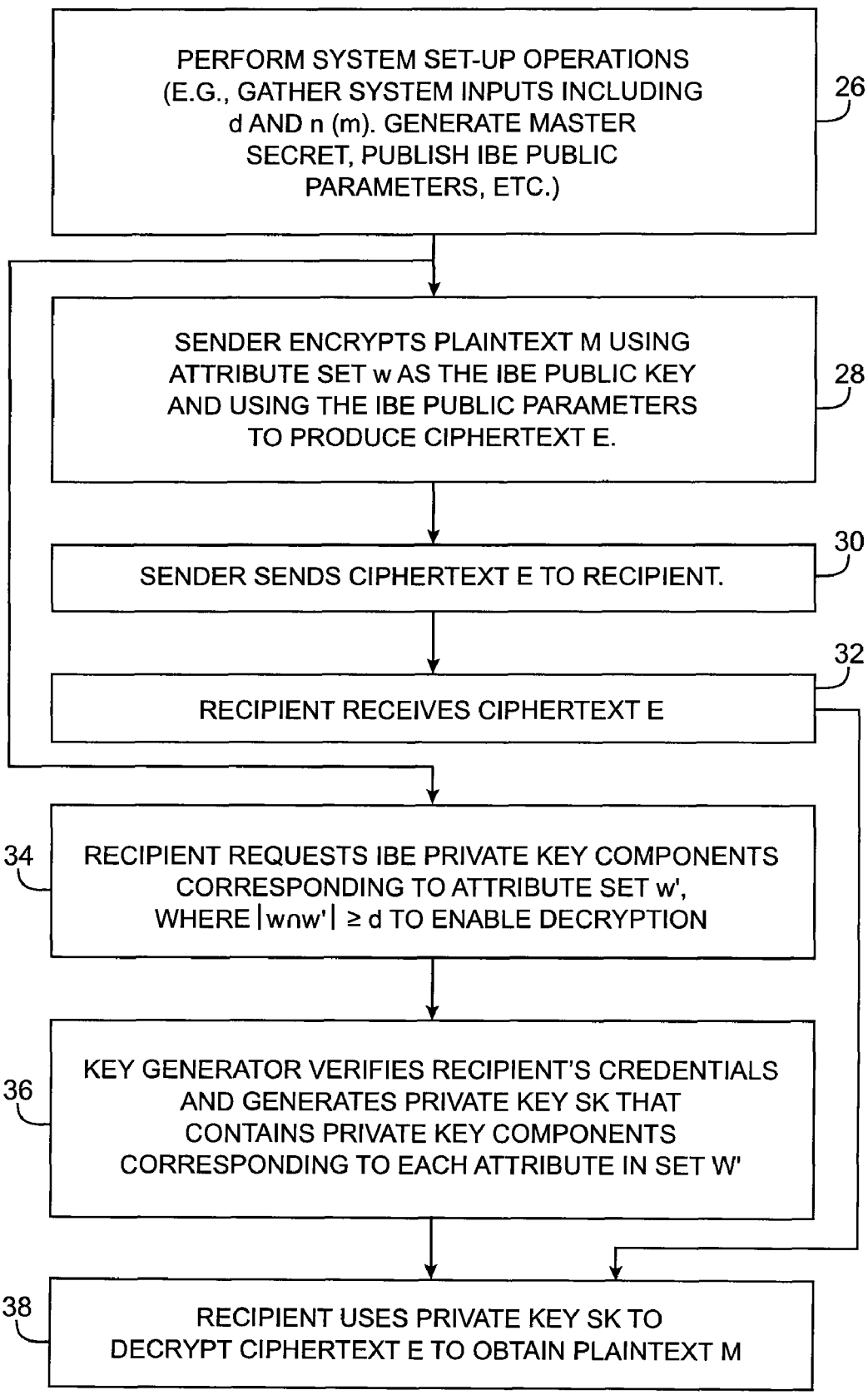
FIG. 4 is a flow chart of illustrative steps involved in performing encryption and decryption operations in accordance with the present invention.

Illustrative steps involved in using the IBE system with partial attribute matching of FIG. 1 are shown in FIG. 4.

At step 26, the key generator 22 (i.e., the system administrator or other entity associated with key generator 22) performs system set-up operations. During system setup, system inputs are gathered from appropriate personnel such as the system administrator. As an example, the system administrator may select a desired value for the threshold attribute overlap parameter d (sometimes called the attribute matching or attribute overlap threshold) and the value for the maximum number of attributes that may be used in forming an attribute set w for a private key SK (this parameter is referred to as n or m, depending on context).

Two embodiments of the partial attribute matching IBE scheme are described below. In the first embodiment, called the unconstrained attribute approach or large universe construction, the system has unconstrained attributes (attributes can be any arbitrary string). In the unconstrained attribute approach, the value of n represents the maximum number of attributes that may be used in forming the attribute set. In the second embodiment, called the enumerated attribute approach, the system has enumerated attributes. Attributes must belong to a finite set of integers (i.e., attributes are represented by these integers). In the enumerated attributed approach, the value of m represents the maximum number of attributes that may be used in forming an attribute set and also represents the maximum number of distinct attributes supported by the system.

During setup step 26, the private key generator 22 generates or otherwise obtains a master secret. For example, private key generator 22 may create a master secret from a number that is randomly generated at the private key generator by a processor housed inside a tamper-proof enclosure. The master secret may also be produced off-site and delivered to the private key generator 22.

The master secret (also sometimes referred to as a secret master key or a master key) is secret information that is used by the IBE key generator 22 to generate IBE private key components. The IBE key generator 22 also uses the master secret in generating the IBE public parameter information. During the setup operations of step 26, the IBE public parameters that are generated are published. With one suitable arrangement, the IBE key generator 22 provides the IBE public parameters to a particular host server 24 that a sender can reach using an associated domain name or other suitable service name that is generated based on the recipient's public key (e.g., using a known service-name generation rule). These are merely illustrative techniques for making the public parameter information available to users in system 10. Any suitable technique for making the public parameter information available to the users may be used if desired.

At step 28, the sender encrypts the plaintext M. In performing these IBE encryption operations, the sender uses an attribute set w as the IBE public key of the recipient. At least some of the attributes preferably correspond to real world conditions to be satisfied by the recipient. During encryption, the sender uses the IBE public parameters that were published at step 26. Encryption is performed using IBE encryption engine 14. The output of the IBE encryption engine 14 is the encrypted version of the plaintext, called ciphertext E.

At step 30, the sender sends the ciphertext E to the recipient. For example, sender 12 may send ciphertext E to the recipient 18 over network 16. The ciphertext may be sent in the form of an email transmission or any other suitable electronic transmission.

At step 32, the recipient receives the ciphertext. The ciphertext E includes the attribute set w that was used during encryption.

At step 34, independent of steps 28, 30, and 32, the recipient requests the IBE private key components corresponding to the attribute set w'. The request may be made as a single request or a series of related but separate requests, provided that the IBE key generator 22 maintains information on the recipient that is sufficient to relate the separate requests to each other. In making the request, the recipient provides sufficient credentials to certify to the IBE key generator 22 that the recipient has the attributes of attribute set w'. The attributes preferably correspond to real-world conditions that must be fulfilled prior to release of the key components to the recipient by the IBE key generator.

Because the IBE scheme of the present invention supports partial attribute matching, it is not necessary for each of the attributes in the attribute set w' (used for decryption) to match each of the attributes in the attribute set w (used for encryption). For decryption to be successful, it is only necessary that there be a sufficient overlap between attribute sets w and w'. In particular, the value of |w∩w'| must be greater than or equal to the attribute overlap threshold d. If there is insufficient overlap between attribute sets w and w', the private key obtained based on attribute set w' cannot be used to decrypt ciphertext E.

At step 36, the IBE key generator authenticates the recipient's credentials (i.e., credentials such as $CRED_{A-X}$, $CRED_{B-X}$, etc. of FIG. 2) to verify that the recipient satisfies the real-world conditions associated with the attributes of set w' (i.e., attributes such as A, B, and C of FIG. 2) and, if the conditions are properly satisfied, generates an IBE private key SK that contains the private key components (e.g., $SK_A{}^X$, $SK_B{}^X$, $SK_C{}^X$ of FIG. 2) corresponding to the attributes of attribute set w'. The private key is then securely delivered to the recipient (e.g., over a secure path in communications network 16). At the recipient, the recipient can cache the IBE private key. By storing the IBE private key locally, the recipient can use the cached version of the IBE private key during subsequent decryption operations. If a cached key is available and has not expired, the recipient uses the cached key to decrypt the ciphertext. If the cached key has expired or if the recipient has not cached the key yet, the recipient can formulate an IBE key request for the IBE private key generator and the IBE private key generator can provide the requested key to the recipient (steps 34 and 36).

At step 38, the recipient has obtained the ciphertext (step 32) and has obtained the private key SK (from the key generator at step 36 or from a local cache). The recipient therefore uses the private key SK to decrypt the ciphertext E to produce the plaintext M.

As described above, there are two possible embodiments of the present invention. With a first embodiment, called the unconstrained attribute approach, the value of n establishes the maximum number of attributes that may be used in forming an attribute set w.

In the unconstrained attribute approach, the setup step 26 of FIG. 4 may be implemented using the key generator 22.

Initially, a group $G_1$ and a generator g are chosen, where $G_1$ is a bilinear group of prime order p and g is a generator of $G_1$. Additionally, a bilinear map e is chosen such that e: $G_1 \times G_1 \rightarrow G_2$, where $G_2$ is a group of order p. A length n is chosen and attribute sets are restricted to length n.

The Lagrange coefficient $\Delta_{i,S}$ for i in $Z_p$ and a set S of elements in $Z_p$ are defined using equation 1.

$$\Pi[(x-j)/(i-j)] \qquad (1)$$

In equation 1, the product is taken over all integers j in the set S where j is not equal to i.

Attribute sets w can be sets of n elements of $Z_p{}^*$, where $Z_p{}^*$ is the set $\{1, 2, \ldots, p-1\}$. Alternatively, each attribute set w can be a collection of n strings of arbitrary length in which case a collision resistant hash function, H, may be used to hash strings into members of $Z_p{}^*$. When attributes are integers, each integer value can correspond to a different real world condition to be satisfied by a key requester. When attributes are strings, the strings may contains text that helps define the real-world condition.

After setting up group $G_1$ and selecting n, a random y in $Z_p$ is selected and the value of $g=g^y$ is computed, where $Z_p$ is the set $\{0, 1, 2, \ldots, p-1\}$. A $g_2$ in $G_1$ is chosen at random. Next, n+1 elements of $G_1$ (denoted $t_1, \ldots t_{n+1}$) are selected uniformly at random from $G_1$. Let n be the set $\{1, \ldots n+1\}$ and define a function, T, as shown in equation 2.

$$T(x)=[g_2]^z \Pi [t_i]^{Y_i} \quad (2)$$

In equation 2, $z=x^n$, $Yi=\Delta_{i,N(x)}$, and the product is taken over all integers i in N.

The function T may be viewed as the function $g_2^z g^{h(x)}$ for some n degree polynomial h. Parameters $g_1, g_2, t_1, \ldots, t_{n+1}$ are the so-called IBE public parameters that are published (e.g., on the public parameter host 24) during step 26. The value of y is the master secret and is maintained by the IBE key generator 22.

To generate an IBE private key (step 36 of FIG. 4) using the unconstrained attribute approach, a d−1 degree polynomial q is randomly chosen such that q(0)=y. The private key SK corresponding to attribute set w' is made up of two sets. The first set is {Di} where i is an element in w'. The elements of this set are constructed using equation 3 for each i in w'.

$$Di=g_2^{q(i)} T(i)^{Ri} \quad (3)$$

In equation 3, Ri is a random member of $Z_p$ for each such i in w. The second set is $\{d_i\}_{i \in w}$, where the elements of $\{d_i\}$ are constructed using equation 4.

$$d_i = g^{Ri} \quad (4)$$

Using the unconstrained attribute approach, encryption (step 28 of FIG. 4) for attribute set w of plaintext M in $G_2$ involves choosing a random value s in $Z_p$. The ciphertext E is then computed using equation 5.

$$E=(w, E'=Me(g_1,g_2)^s, E''=g^s, \{E_i=T(i)^s\}_{i \in w}) \quad (5)$$

Using the unconstrained attribute approach, decryption (step 38 of FIG. 4) uses a private key SK for attribute set w'. The attribute sets w and w' need not be the same. Decryption will succeed if the ciphertext E is encrypted for the attribute set w and the private key SK corresponds to attribute set w', where $|w \cap w'| \geq d$. The IBE decryption engine 20 parses E to obtain components w, E', E'', and $\{E_i\}$. An arbitrary d-element subset S of w∩w' is chosen. The IBE decryption engine 20 then decrypts the ciphertext E by computing the plaintext M using equation 6.

$$M=E'\Pi [e(d_i, E_i)/e(D_i, E'')]^{\delta i} \quad (6)$$

In equation 6, $\delta i=\Delta_{i,S(0)}$ and the product is taken over all integers i in set S. The d values of $\Delta_{i,S(0)}$ in the exponent of equation 6 allow interpolation of the polynomial q(x) which is of degree d−1.

With the arrangement of the first embodiment, the number of exponentiations in the group $G_1$ to encrypt to an attribute set will be linear in the number of elements in the set. The cost of decryption will be dominated by 2d bilinear map computations. An important aspect of this scheme is that the number of group attributes in the IBE public parameters only grows linearly with n, the maximum number of attributes that can describe an encryption attribute set. The number of group elements that make up a user's private key grows linearly with the number of attributes associated with that user's identity. The number of group elements in a ciphertext E grows linearly with the size of the attribute set being encrypted to.

The second embodiment of the IBE scheme with partial attribute matching of the present invention is the so-called "enumerated attributes" approach. As with the unconstrained attribute approach, in the enumerated attribute approach a ciphertext E is created by encrypting plaintext M using an attribute set w and can be decrypted by a private key corresponding to an attribute set w', provided that $|w \cap w'| \geq d$. The value of d is an integer that establishes the attribute matching threshold.

In enumerated attribute approach, the attributes must belong to a finite set of integers. The value m sets the maximum number of attributes that may be used in forming an attribute set for a private key SK and also sets the maximum number of distinct attributes supported.

The setup operations (step 26 of FIG. 4) of the enumerated attribute approach involve selecting a bilinear group $G_1$ of prime order p and a generator g of $G_1$. A bilinear map e is selected that satisfies the decisional bilinear Diffie-Hellman (BDH) assumption. For all a and b, $e(g^a, g^b)=e(g,g)^{ab}$ (bilinearity) and $e(g,g) \neq 1$ (e is non-degenerate).

Equation 7 defines the Lagrange coefficient $\Delta_{i,S}$ for $i \in Z_p$ and a set, S, of elements in $Z_p$.

$$\Delta_{i,S(x)}=\Pi[(x-j)/(i-j)] \quad (7)$$

In equation 7, the product is taken over all integers j in the set S where $j \neq i$. Attribute sets w are subsets of a universe U of size m. U is defined as a subset of $Z_p^*$, where each integer in U is used to represent a real world security condition to be satisfied by the private key requester (recipient).

After choosing $G_1$ and m, setup operations continue by defining the universe U of elements. For example, the first m elements of $Z_p^*$ may be used as the universe U—i.e., the integers $1, \ldots m(\bmod p)$. Next, $t_1, \ldots, t_m$ are chosen uniformly at random from $Z_p$. The parameter y is also chosen uniformly at random from $Z_p$. The IBE public parameters PP that are published are given by equation 8.

$$PP=\{T_1=g^{t_1}, \ldots, T_m=g^{t_m}, Y=e(g,g)^y\} \quad (8)$$

The master key MK is given by equation 9.

$$MK=t_1, \ldots t_m, y \quad (9)$$

With the enumerated attribute approach, the key generation process (step 36 of FIG. 4) involves generating a private key SK for attribute set $w' \subseteq U$. During setup, a d−1 degree polynomial 1 is randomly chosen such that q(0)=y. The private key SK is made up of elements $(D_i)_{i \in w'}$, where $D_i = g^{[q(i)/ti]}$ for every $i \in w'$.

With the enumerated attribute approach, the encryption process (step 28 of FIG. 4) involves encryption for an attribute set w of plaintext M in $G_2$. First, a random value s in $Z_p$ is chosen. The ciphertext E is then computed using equation 10.

$$E=(w, E'=MY^s, \{E_i=T_i^s\}_{i \in w}) \quad (10)$$

Note that the attribute set w is included in the ciphertext E.

In the enumerated attribute approach, the decryption process (step 38 of FIG. 4) will be successful, provided that the ciphertext E, which was encrypted for attribute set w, is decrypted with a private key SK for an attribute set w' where $|w \cap w'| \geq d$ (where d is the partial attribute overlap threshold). In decryption, an arbitrary d-element subset S of w∩w' is chosen. The ciphertext E is then decrypted to produce plaintext M using equation 11.

$$M=E'/\Pi(e(D_i, E_i))^{\delta i} \quad (11)$$

In equation 11, $\delta i=\Delta_{i,S(0)}$ and the product is taken over all integers i in set S. Note the d values of $\Delta_{i,S(0)}$ in the exponent of equation 11 allow interpolation of the polynomial q(x) which is of degree d−1.

With the enumerated attribute approach, the number of exponentiations in the group $G_1$ to encrypt to an attribute set will be linear with the number of attributes in the set. The cost of decryption is dominated by d bilinear map computations.

The number of group elements in the IBE public parameters grows linearly with the number of attributes in the system (elements in the defined universe). The number of group elements that make up a user's private key grow linearly with the number of attributes associated with that user's identity (attribute set). The number of group elements in a ciphertext E grows linearly with the size of the attribute set being encrypted to.

In some applications, it may be desirable to use a relatively low value of d. For example, if a biometric input device is not completely reliable, it might be desirable to relax the partial attribute overlap threshold. This type of arrangement could be used to provide flexibility in the number of biometric attributes required to access a document (as an example).

Figure 5:
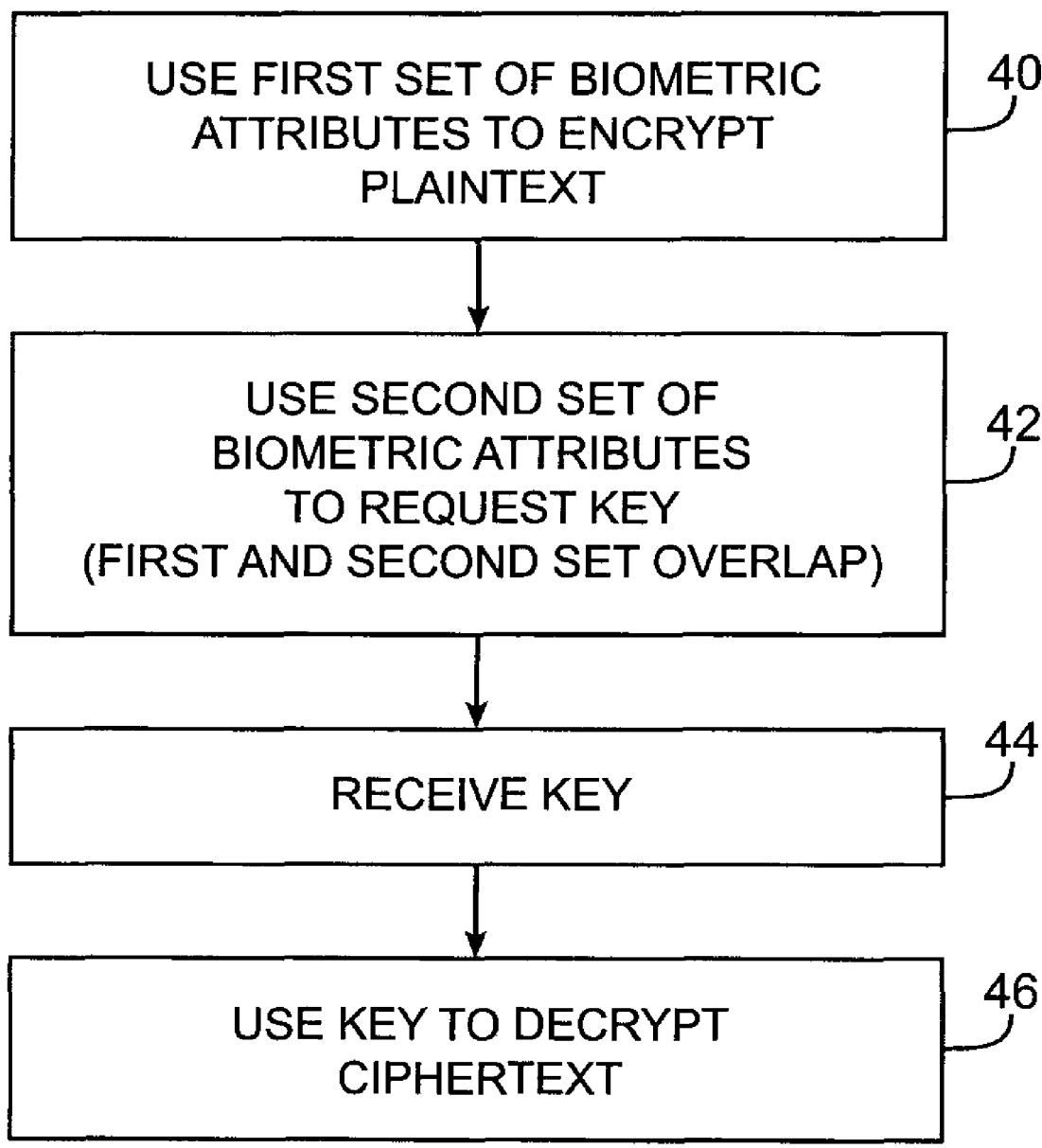
FIG. 5 is a flow chart of illustrative steps involved in using biometric attributes in an IBE system with partial attribute matching in accordance with the present invention.

Illustrative steps involved in using IBE with partial attribute matching in the context of a biometric-based system are shown in FIG. 5.

At step 40, a user uses a first set of biometric attributes to encrypt plaintext M. The biometric attributes may be obtained from any suitable biometric sensor. For example, the biometric attributes may be portions of an iris scan, fingerprint points obtained from a fingerprint scanner, voiceprint markers obtained from a voice scan, etc. The biometric attributes are obtained from a real-world sensor, so there may be errors involved. For example, some of the fingerprint points obtained in the course of reading the user's fingerprint may be correct and some may not be correct. Nevertheless, the set of correct and incorrect biometric attributes is used to encrypt the plaintext M to produce ciphertext E at step 40.

At step 42, a second set of biometric attributes is used to request the IBE private key components needed to decrypt the ciphertext. In one scenario, the second set of biometric attributes is acquired from the same user whose biometric attributes were used during encryption to produce the ciphertext of step 40 (e.g., using the same biometric sensor or another biometric sensor). Because of inaccuracies in both the first and second uses of a biometric sensor to read the user's biometric attributes, the first and second sets of biometric attributes do not match exactly, but merely overlap. Provided that the overlap is more than the partial attribute matching threshold d, the requested key can be used to decrypt the ciphertext.

At step 44, the requested IBE private key is obtained.

At step 46, the IBE private key may be used to decrypt the ciphertext.

The foregoing is merely illustrative of the principles of this invention and various modifications can be made by those skilled in the art without departing from the scope and spirit of the invention.

What is claimed is:

1. A computer-implemented method for using identity-based-encryption (IBE) with partial attribute matching to support secure communications, wherein an attribute overlap threshold d with an integer value defines a required degree of attribute matching for successful decryption, comprising:

at a sender, running an IBE encryption engine with computing equipment to encrypt plaintext M to produce ciphertext E, wherein the IBE encryption engine uses as inputs the plaintext M, IBE public parameters, and an IBE public key associated with an intended recipient, wherein the IBE public key associated with the recipient includes a set of attributes w that correspond to conditions that the intended recipient is to satisfy before being permitted to perform decryption operations; and at a given recipient, running an IBE decryption engine with computing equipment to decrypt the ciphertext E to produce the plaintext M, wherein the IBE decryption engine uses as inputs the ciphertext E and an IBE private key SK associated with the given recipient, wherein the IBE private key SK contains IBE private key components, each of which corresponds to a respective attribute in an attribute set w' of attributes of the given recipient, wherein w' is not equal to w, and wherein in order to decrypt the ciphertext E to produce the plaintext M it is necessary that there is an overlap |w∩w'| between the attribute set w and the attribute set w' that is equal to or greater than the attribute overlap threshold d.

2. The method defined in claim 1 further comprising:

at the given recipient, requesting the IBE private key components corresponding to attribute set w' from an IBE private key generator; and establishing for the IBE private key generator that the given recipient has each of the attributes in the attribute set w'.

3. The method defined in claim 1 further comprising:

requesting that an IBE private key generator provide the IBE private key components to the given recipient over a communications network, wherein requesting that the IBE private key generator provide the IBE private key components comprises providing the IBE private key generator with the attribute set w' and recipient credentials that certify that the given recipient has each of the attributes in attribute set w'; and at the IBE private key generator, authenticating the recipient credentials to verify that the given recipient has each of the attributes in the attribute set w'; and if the given recipient has each of the attributes, providing the requested IBE private key components from the IBE private key generator to the given recipient over the communications network.

4. The method defined in claim 1 wherein an IBE private key generator provides the IBE private key components to the given recipient over a communications network, the method further comprising using the IBE private key generator to generate and publish the IBE public parameters, wherein the IBE private key generator uses a master secret MK and a parameter n in generating the IBE public parameters, wherein the parameter n represents the maximum number of attributes allowed in a valid attribute set w'.

5. The method defined in claim 1 wherein an IBE private key generator provides the IBE private key components to the given recipient over a communications network, the method further comprising using the IBE private key generator to generate and publish the IBE public parameters, wherein the IBE private key generator uses a master secret MK and a parameter m in generating the IBE public parameters, wherein the parameter m represents the maximum number of attributes allowed in a valid attribute set w' and represents the maximum number of distinct attributes supported by the IBE private key generator.

6. The method defined in claim 1 further comprising obtaining the attribute set w and the attribute set w' using biometric sensors.

7. The method defined in claim 1 further comprising transmitting the ciphertext from the sender to the given recipient using email.

8. The method defined in claim 1 further comprising:

using an IBE private key generator to generate the IBE public parameters.

9. The method defined in claim 1 further comprising:

using an IBE private key generator to generate the IBE public parameters; and publishing the IBE public parameters generated by the IBE private key generator on an IBE public parameter host.

10. The method defined in claim 1 further comprising:
using an IBE private key generator to generate the IBE public parameters;
publishing the IBE public parameters generated by the IBE private key generator on an IBE public parameter host; and
at the sender, obtaining the IBE public parameters from the IBE public parameter host over a communications network.

11. The method defined in claim 1 further comprising:
using an IBE private key generator to generate the IBE public parameters;
publishing the IBE public parameters generated by the IBE private key generator on an IBE public parameter host;
at the sender, obtaining the IBE public parameters from the IBE public parameter host over a communications network; and
at the sender, following encryption of the plaintext M to produce the ciphertext E, sending the ciphertext E to the given recipient over the communications network.

12. The method defined in claim 1 further comprising:
using an IBE private key generator to generate the IBE public parameters;
publishing the IBE public parameters generated by the IBE private key generator on an IBE public parameter host;
at the sender, obtaining the IBE public parameters from the IBE public parameter host over a communications network;
at the sender, following encryption of the plaintext M to produce the ciphertext E, sending the ciphertext E to the given recipient over the communications network;
at the given recipient, receiving the ciphertext E from the sender; and
at the given recipient, requesting the IBE private key SK from the IBE private key generator.

13. The method defined in claim 1 further comprising:
using an IBE private key generator to generate the IBE public parameters;
publishing the IBE public parameters generated by the IBE private key generator on an IBE public parameter host;
at the sender, obtaining the IBE public parameters from the IBE public parameter host over a communications network;
at the sender, following encryption of the plaintext M to produce the ciphertext E, sending the ciphertext E to the given recipient over the communications network;
at the given recipient, receiving the ciphertext E from the sender; and
at the given recipient, requesting the IBE private key SK from the IBE private key generator, wherein the IBE private key request includes recipient credentials that establish that the given recipient has each of the attributes in the attribute set w'.

14. The method defined in claim 1 further comprising:
using an IBE private key generator to generate the IBE public parameters;
publishing the IBE public parameters generated by the IBE private key generator on an IBE public parameter host;
at the sender, obtaining the IBE public parameters from the IBE public parameter host over a communications network;
at the sender, following encryption of the plaintext M to produce the ciphertext E, sending the ciphertext E to the given recipient over the communications network;
at the given recipient, receiving the ciphertext E from the sender;
at the given recipient, requesting the IBE private key SK from the IBE private key generator, wherein the IBE private key request includes recipient credentials that establish that the given recipient has each of the attributes in the attribute set w'; and
at the private key generator, verifying the recipient credentials and, if the credentials are authentic, transmitting the IBE private key components for the IBE private key SK from the IBE private key generator to the given recipient over the communications network.

15. The method defined in claim 1 wherein at least one of the IBE private key components corresponds to a biometric attribute of the given recipient.

16. The method defined in claim 1 wherein the set of attributes w includes at least one biometric attribute of the given recipient.

* * * * *

UNITED STATES PATENT AND TRADEMARK OFFICE
CERTIFICATE OF CORRECTION

PATENT NO. : 7,634,085 B1  Page 1 of 1
APPLICATION NO. : 11/090451
DATED : December 15, 2009
INVENTOR(S) : Sahai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1218 days.

Signed and Sealed this

Ninth Day of November, 2010

David J. Kappos
*Director of the United States Patent and Trademark Office*